United States Patent [19]

Pesovic et al.

[11] Patent Number: 4,778,149

[45] Date of Patent: Oct. 18, 1988

[54] SILENT VALVE

[76] Inventors: Predrag Pesovic; Radomir Zebeljanovic; Radoljub Stijelja, all of Golubinacka St. No. 89, YU-22310, Simanovci, Yugoslavia

[21] Appl. No.: 79,215

[22] Filed: Jul. 29, 1987

[30] Foreign Application Priority Data

Aug. 13, 1986 [YU] Yugoslavia .......................... 1438/86
Jan. 12, 1987 [YU] Yugoslavia .............................. 31/87

[51] Int. Cl.⁴ ...................... F16K 25/00; F16K 31/50
[52] U.S. Cl. .................... 251/205; 251/210; 251/267; 251/268; 137/454.5
[58] Field of Search .................... 137/454.5; 251/210, 251/211, 88, 205, 230, 266, 267, 268

[56] References Cited

U.S. PATENT DOCUMENTS

| | | | |
|---|---|---|---|
| 1,062,614 | 5/1913 | Sneddon | 251/210 |
| 2,838,270 | 6/1958 | Danielson | 251/230 |
| 2,994,343 | 8/1961 | Banks | 251/210 |
| 3,082,786 | 3/1963 | McLean | 251/267 |
| 3,125,122 | 3/1964 | Bermingham | 251/210 |
| 4,221,238 | 9/1980 | Madsen | 251/230 |
| 4,468,001 | 8/1984 | Stanic | 251/268 |
| 4,493,338 | 1/1985 | Petursson | 251/267 |
| 4,549,716 | 10/1985 | Warren | 251/230 |

FOREIGN PATENT DOCUMENTS

| | | | |
|---|---|---|---|
| 2320418 | 10/1974 | Fed. Rep. of Germany | 251/266 |
| 2737839 | 3/1979 | Fed. Rep. of Germany | 251/266 |
| 1412732 | 8/1965 | France | 251/266 |

*Primary Examiner*—George L. Walton
*Attorney, Agent, or Firm*—Faegre & Benson

[57] ABSTRACT

This invention relates to a silent valve, consisting of a body 9 in which a shaft 10 having thread 8 is rotatably positioned for helical engagement with a piston carrier 7. Piston carrier 7 has an opening 24 on its head, in which a boss 25 of the piston 1 is positioned. The piston 1 is removably secured to piston carrier 7 by teeth 22 which grasp a circumferential flange 18 of the piston 1. A ring-like seal 15 is positioned on the piston 1 for selective opening of slots 4 on the hollow portion of head 3 for allowing fluid to flow through the valve. Piston carrier 7 also has a flange 38 with notches 39, 40 receiving cogs 35, 36 of securing element 20, positioned on the neck 30 of the shaft 10.

6 Claims, 2 Drawing Sheets

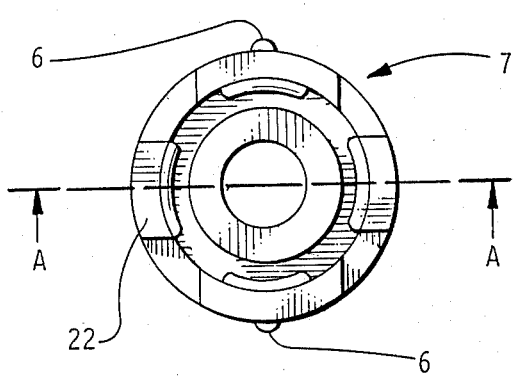
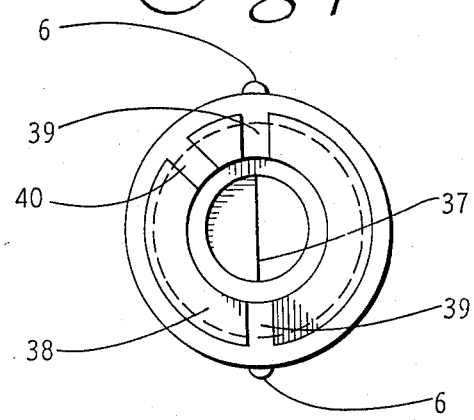
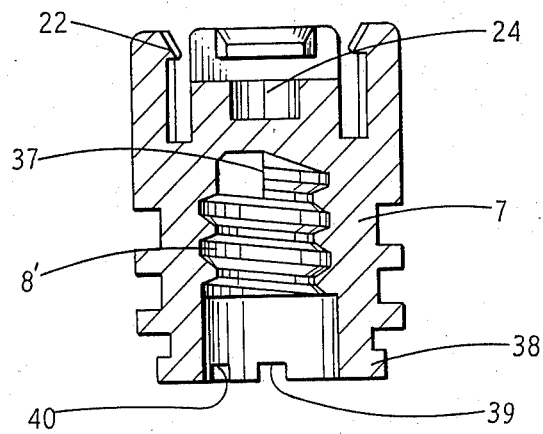
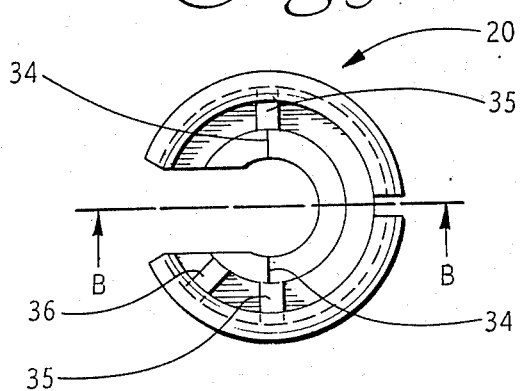
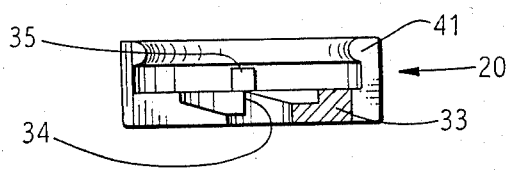

SILENT VALVE

BACKGROUND OF THE INVENTION

This invention relates to a design for a silent valve and belongs to the group of water-sanitary armatures for all kinds of fluids. According to the International Patent Classification, this invention is classified into the group F 16K 1/02, relating to opening regulation and closing the flow of liquids.

Known valves, for instance valves for household use, which have a thread and nut and a seal pressing against a valve seat, have shown a series of disadvantages. One disadvantage is that known designs allow too strong or too weak compression of the seal against the valve seat, leading to valve seat erosion. A common effect is leaking, which requires machining the valve seat, as for example bibb seat reaming, which operation can be done only a relatively few times before the valve is rendered unfit for further service.

Another disadvantage of known valves is in the fact that very significant friction and erosion may occur between the thread and nut, resulting in malfunction of the entire assembly. Such friction causes enlargement of the clearance between thread and nut, permitting the moving parts of the valve to vibrate in response to fluid pressure, which causes hydraulic shocks to the whole installation along with undesirable noise. Such noise may occur with or without cavitation.

Still another disadvantage of known valves is that fact that often all the parts of the valve are made of the same kind of material, so that, when the valve is out of service for some time, or if the temperature difference is too high, valve operation can be blocked because of seizing or interference between parts.

It is the object of this invention to provide a valve design which will close the fluid flow efficiently, without cavitation, and which is noiseless when opened and block-proof even after a prolonged out-of-service period.

BRIEF DESCRIPTION OF THE DRAWINGS

FIG. 2 is a plan view from above of a piston carrier.

FIG. 3 is a section view along line AA from FIG. 2, showing the piston carrier.

FIG. 4 is a plan view from below of the piston carrier shown on FIG. 2.

FIG. 5 is a plan view from above of a security element.

FIG. 6 is a section view along line BB on FIG. 5, showing various features of the security element.

DETAILED DESCRIPTION

Figure 1:
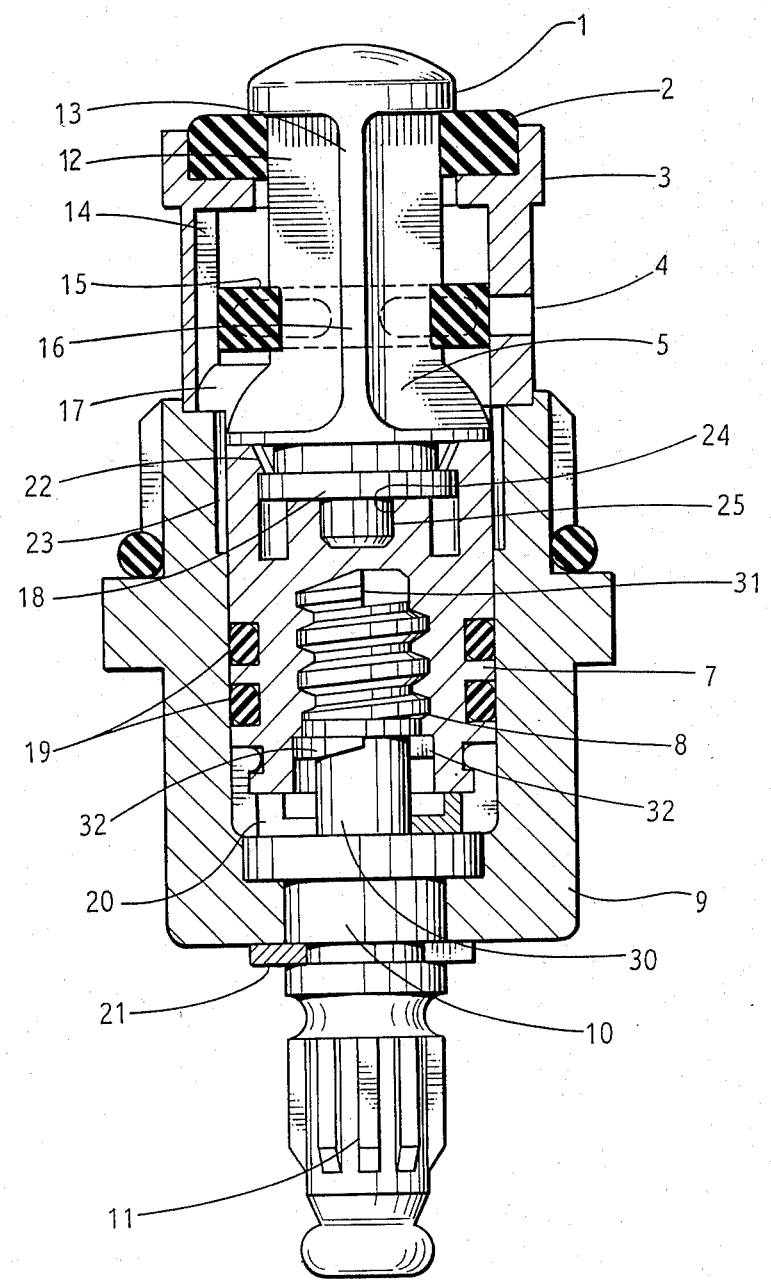
FIG. 1 is an elevational section view through the valve of this invention, illustrating the parts thereof.

FIG. 1 shows a body 9 of the valve of the present invention with a bar or threaded shaft 10 positioned in a cylindrical bore thereof, and secured on the outside of the body 9 by a ring 21 to prevent axial movement. A piston carrier 7 is carried on the thread 8 of the shaft 10 and sealed against the body 9 by a pair of rubber O-rings 19, positioned in grooves on the outer surface of the piston carrier 7.

FIGS. 2, 3 and 4 show various views of piston carrier 7, with the opening 24 on the head, used for central positioning of a piston 1 and with radially oriented teeth 22 grasping an edge or flange 18 of the piston 1. A plurality of lateral protrusions 6 are formed on the head of the piston carrier 7, for interengagement with a plurality of cogs 23, formed on the interior of body 9. Protrusions 6 are preferably opposite to one another and their role will be explained later.

Threaded shaft 10 shown in FIG. 1 has a pair of cogs or abutment faces 31 and 32 respectively at the beginning and at the end of the thread 8, so that each pair consists of two opposite cogs, while each member of a pair is positioned 90° relative to the other member of that pair. Piston carrier 7 has an internal thread 8'. The end of the thread 8' has opposite cogs or mating abutment faces 37 against which cogs 31 of the thread 8 of the threaded shaft 10 rest when the shaft 10 is fully received in the piston carrier 7. This engagement of cogs 31 on the cogs 37 prevents blocking or seizing of the valve.

Axially oriented grooves or notches 39 are formed opposite each other on the flange 38 of the piston carrier 7, and a third positioned groove or notch 40 is positioned at an angle of 45° to notch 37. Cogs 35 mate with notches 39 and positioning cog 36 of a securing element 20 enters and mates with positioning groove 40.

Securing element 20, shown in the FIGS. 5 and 6, has a base plate 33 with half-circle, inclined cogs 34, which rest against the cogs 32 of the shaft 10 when the valve is opened. The base plate 33 has also cogs 35 opposite each other, as well as a third, positioning cog 36, positioned at the angle of 45° to one of cogs 35. Securing element 20 also has an edge or radially projecting lip 41, which is pressed on the flange 38 of the piston carrier 7 during assembly.

Piston 1, shown on FIG. 1, is preferably made of die-cast synthetic material and has vanes 12, 13 for directing a fluid in the valve. The vanes 12, 13 are connected at one end with a piston base 5, which has protrusions 17 for axially guiding the piston 1. Below the piston base 5, an edge or circumferential flange 18 is positioned, which is grasped by the teeth 22 of the piston carrier 7. An axle or boss 25 is received in an opening or bore 24 in the piston carrier 7. A thin-walled rubber seal 15 is positioned in a set of circumferential grooves 16 formed in the vanes 12, 13.

A valve head member 3 having a hollow region is positioned on body 9, with a rubber seal 2 on the end thereof. The hollow head member 3 has on its internal surface two opposite grooves 14 receiving and axially guiding the protrusions 17 of the piston 1 and preventing rotation of piston 1 with respect to head 3. The head 3 also has apertures or radial exhaust slots 4 positioned at an angle of 45° to the vanes 12, 13 of the piston 1, so that the fluid exiting the valve is directed by the vanes 12, 13 to the slots 4. When the valve is closed, the sealing ring 15 covers all four slots 4 in the head 3. The seal 15 is preferably made of synthetic material.

The silent valve according to this invention operates in the following way:

The valve shown in FIG. 1 can be positioned in a new pipe, or in a mended pipe, provided that the valve seat is machined, i.e., made flat, so that the rubber seal 2 can be properly positioned on it.

By turning the handle (not shown) positioned on the splines 11 of the threaded shaft 10, in a counter-clockwise direction, the thread 8 is wound out of the piston carrier 7, i.e., carrier 7 moves axially, urging piston 1 in an axial direction. The piston 1 rises from the rubber seal 2 and opens a small annular or ring-like opening through which the fluid enters into the hollow region of head member 3, while the seal 15 has not yet passed the lower edge of the slots 4 on the hollow region of head 3. By further turning of the shaft 10 in the same direction, the piston 1 rises even more, opening a larger ring-like opening, while the seal 15 uncovers the slots 4, so that the fluid can pass through. The vanes 12, 13 direct the fluid to the slots 4. Closing of the valve is made in the opposite order, so that the slots 4 are closed first, and after that, the piston stops the flow completely, seating against seal 2.

As can be seen from FIG. 1, the piston 1 is guided axially by the protrusions 17 in grooves 14 and there is no possibility of rotating the piston, so that the vanes 12, 13 direct the fluid always in the same way.

The valve according to this invention cannot be fractured by over-tightening of the shaft 10 by the handle (not shown). Cogs 23 interior of the body 9 (in the upper part which is in constant contact with the fluid) cooperate with the protrusions 6 of the piston carrier 7. While closing the valve, by turning the shaft 10 clockwise, the piston 1 is pressed against the seal 2 by a certain force, as long as the shaft 10, by its cogs 31, rests against the cogs 37 of the thread 8' of the piston carrier 7, when the resistance suddenly rises, so that the piston carrier 7 rotates together with the shaft 10, while elastic protrusions 6 jump over or "ratchet" against the cogs 23, as teeth 22 slide around the flange 18 of the piston 1. This action causes a distinctive sound, which is the signal that the valve is fully closed and that further rotating is of no use. A similar result occurs when the user tries to open the valve too much, urging the cogs 32 of the shaft 10 against the cogs 34 of the securing element 20, which besides the ratcheting effect prevents the blocking of the shaft 10, i.e., the seizure of thread 8.

The valve shown on FIG. 1 is preferably made of synthetic material, except seals 2 and 19, and ring 21, so that cavitation is completely avoided and very low friction is achieved, while maintaining low cost, because of the materials applied.

It was proved by experiments that the valve according to this invention is very reliable and quiet in operation, due to the vanes 12, 13 on the piston 1, which direct the fluid through the slots 4 in the hollow region of head 3 adjacent seal 15, making the operation of the valve substantially noiseless.

The invention is not to be taken as limited to all the details thereof as modifications and variations thereof may be made without departing from the spirit or scope of the invention.

What is claimed is:

1. A silent valve for liquid and gaseous fluids, characterized by:
   (a) a valve body having an axially grooved hollow head portion with radial exhaust slots therein;
   (b) a threaded shaft rotatably secured in said body;
   (c) a piston carrier helically engaged with said shaft by a set of mating threads and carrying a plurality of radially oriented teeth;
   (d) a piston projecting through said head portion and having;
      (i) a circumferential flange, grasped by said teeth;
      (ii) a plurality of slotted vanes;
      (iii) a ring-like seal carried by said slotted vanes adapted to selectively cover and expose said radial exhaust slots as said piston and slotted vanes move in said head portion; and
      (iv) a protrusion engaged in said axially-oriented groove of said head portion for permitting axial movement and restricting rotational movement of said piston
   such that rotational movement of said shaft is translated into axial movement of said piston by said carrier.

2. A silent valve according to claim 1 further characterized in that said carrier has a plurality of radially oriented protrusions and said body has a plurality of radially oriented cogs for receiving said protrusions such that said carrier is restrained to move axially with respect to said body within a range of axial travel of said mating threads.

3. A silent valve according to claim 1 further characterized in that said shaft threads have an axially aligned abutment face at each end thereof; and said carrier has a radially projecting flange and axially oriented notches; and wherein said valve is further characterized by a radially slotted securing element positioned on said shaft and having an axially aligned abutment face, axially projecting cogs engaging said notches and a radially projecting lip engaging said flange wherein one axially aligned abutment face at one end of said shaft threads and said axially aligned abutment face of said securing element are in mating engagement at one end of the range of axial travel of said mating threads such that further axial travel of said carrier in a first direction is prevented.

4. A silent valve according to claim 3 further characterized in that said carrier threads have an axially aligned abutment face at one end thereof for mating engagement with said axially aligned abutment face at the other end of said shaft threads such that at the other end of the range of axial travel of said mating threads further axial travel of said carrier in a second direction is prevented.

5. A silent valve according to claim 3 wherein said carrier is caused to move in a first rotational direction with respect to said body at said one end of axial travel as said carrier protrusions ratchet in said first rotational direction past said cogs in said body.

6. A silvent valve according to claim 4 wherein said carrier is caused to move in a second rotational direction with respect to said body at said other end of axial travel as said carrier protrusions ratchet in said second rotational direction past said cogs in said body.

* * * * *